June 4, 1968     E. D. MILLER     3,386,723
VACUUM DEGASSER CONDUIT
Filed Sept. 10, 1965
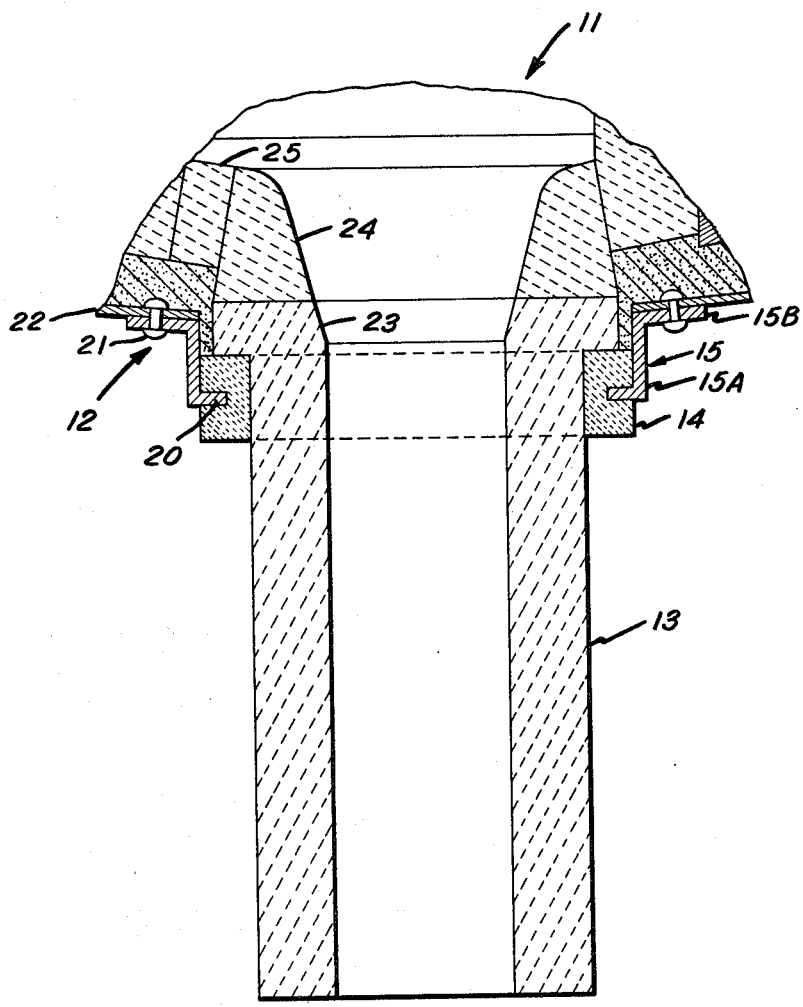
INVENTOR.
ELDON D. MILLER
ATTORNEY

United States Patent Office 3,386,723
Patented June 4, 1968

3,386,723
VACUUM DEGASSER CONDUIT
Eldon D. Miller, Bridgeville, Pa., assignor to Dresser Industries, Inc., a corporation of Delaware
Filed Sept. 10, 1965, Ser. No. 486,411
2 Claims. (Cl. 266—34)

ABSTRACT OF THE DISCLOSURE

A refractory conduit for use as a vacuum degasser snorkle having a very low permeability and being made from a high alumina refractory batch.

---

As the requirement for metals with improved properties has continued to increase, the metals industry has had to turn to more contemporary techniques to improve product. One such technique is to remove entrapped gases that are acquired by the metal during the refining processes. Generally speaking, these gases can cause brittleness in the metal. Techniques and equipment for removing the gases while the metal is still molten are several. One apparatus, for example, is known as the Dortmund-Horder degasser. In this apparatus, an enclosed vacuum chamber with a conduit attached in open communication with its base is positioned over a ladle of molten steel. The conduit is immersed in the molten steel, a vacuum drawn upon the chamber, and molten metal rushes up through the conduit into the chamber releasing entrapped gases. After the chamber is nearly filled, the vacuum is released and the molten metal returns to the ladle. This process is often repeated many times before the desired low gas level is obtained.

In another type of degassing apparatus, two conduits are attached in open communication with the base of the degassing chamber. The metal is drawn up through one conduit and returns to the ladle through another.

Conduits joining degassing chambers and ladles have been constructed of a combination of refractory brick and monolith, mortar and metal. A metal pipe or conduit forms the skelton or support against which the refractories are placed. Conduits of this type have not been altogether successful. One disadvantage results primarily from difference in coefficient of thermal expansion between the metal and refractories; that is, the metal pipe expands on heat-up more than refractory coating which leads to loosening of the refractories and ultimately to failure.

It has also been suggested to provide ceramic conduits of different diameters so that they can be arranged concentrically with a metal conduit placed therebetween. The metal tube is necessary because ceramic conduit of the prior art has been considered to permeable to permit a vacuum to be drawn on the degassing chamber. This construction has been stated to obviate the problems of the previously discussed type of conduit construction. But, this also has not been altogether satisfactory. For example, the metal tube is not protected by an insulating layer of refractory and, therefore, may become warped and even melt. Furthermore, gaps between the concentric ceramic conduit and the metal tube must be filled. Some requirements of this fill material are that it be compressible to accommodate the different thermal expansion of the metal tube and the ceramic; and, at the same time, it must be resistant to attack by hot metal. This is one of the same problems faced with the brick and metal conduit construction.

In addition to the requirements outlined above, degassing chambers with ladles should be resistant to corrosion and abrasion by the washing action of hot metal and possibly slag. The conduit should be well bonded so that particles of refractory do not crumble away and contaminate the metal being treated. Furthermore, the conduit should not be susceptible to spalling due to rapid temperature change.

It is therefore an object of this invention to provide a device for degassing molten metal having a joint free conduit for drawing molten metal into the degassing chamber, which conduit is not easily eroded by the washing action of molten metal and slags, which is not susceptible to spalling caused by rapid change in temperatures, which does not react with metal, which is nearly impermeable, and which has a tight structure, i.e., one which does not develop free play between parts easily.

Briefly, according to one aspect, the objects and advantages of this invention are obtained in a device for degassing molten metal which is comprised of a ladle for containing the molten metal, a chamber for removing the gases from the metal (the chamber being positioned above the ladle) and having a conduit attached in open communication with it so that when a vacuum is applied to the upper chamber molten metal can be drawn up through the conduit from the ladle. The conduit is a fired refractory tube with a permeability of less than about 0.05 cu. in./sec./in.$^2$/in. thickness/lb. air pressure.

For example, the conduit may be made from a high alumina refractory batch consisting of 45–85%, by weight, of selected high alumina refractory material. The selected material analyzes at least about 50% $Al_2O_3$, by weight on an oxide analysis. The refractories batch also includes up to about 30%, by weight, fused silica, said silica resting on a 65 mesh screen. The total high alumina refractory material and fused silica are between 75 and 85% of the total batch. About 5–15%, by weight, −65 mesh ball clay plasticizer and finely divided calcined alumina comprise the remainder of the batch. The batch is sized so that 50–70% of the batch rests on a 65 mesh screen and 30–50% passes a 65 mesh screen. Of the fraction resting on a 65 mesh screen, from 25–35% is −3+10 mesh. Of the fraction passing 65 mesh at least 70% thereof passes a 150 mesh screen, and a portion thereof passes a 325 mesh screen. The portion passing 325 mesh contains at least a total of 10%, based on the weight of the batch, of calcined alumina and ball clay, the calcined alumina and ball clay being present in substantially equal quantities. This conduit, after firing at about 2000 to 2500° F., is characterized by a relatively coarse, high alumina and fused silica (when it is present) refractory material loosely bonded in place by a mullite matrix having a network or tessellated cracks. In spite of the tessellated cracks, this tube has a permeability below about 0.04 cu. in./sec./in.$^2$/in. thickness/lb. air pressure.

Other objects and advantages of this invention will become apparent from a study of the attached drawing. The drawing is exemplary of but one mode of practicing this invention, and is thereby offered by way of explanation and not by way of limitation.

The drawing is a schematic cross section, partially broken away, of the bottom of a vacuum degasser apparatus according to the invention with an attached one-piece ceramically bonded conduit. In the drawing, the bottom 12 of a degasser is shown with an opening 11 formed therethrough. A refractory conduit 13 is positioned directly below the opening 11. It is held in place by a generally cylindrical collar 14 which is in turn releasably attached to the degasser bottom by fixture 15. The fixture 15 is a generally cylindrical sleeve member of Z shape including a web 15A and a first arm 15B. The web 15A has a second arm 20 which seats in a complementary depression formed in the collar 14. The other arm 15A is apertured at spaced points to receive bolts 21 which are attached in a conventional manner to the bottom shell 22 of the vessel. This structure holds the flange 23 of conduit 13 in firm and contiguous contact with the adjacent surfaces of nozzle 24. Refractory 25 lines the inside surface of shell 22.

The one-piece, ceramically-bonded refractory tube or conduit which operatively joins the degassing chamber with the ladle containing molten metal has properties which allow the degasser to be used in a manner apparently not considered before. For example, it is not necessary to have a skeletal metal conduit supporting ceramic or refractory, thereby eliminating the necessity of bulky insulation and brickwork to protect the metal from heat. Because of its decreased size and weight, the one-piece ceramic conduit construction of this invention permits the use of much smaller ladles. (The conduit does not displace as large an amount of metal). Also, should the conduit become contaminated, it is much easier to replace than prior art conduits.

Having thus described the invention in detail and with sufficient particularity as to enable those skilled in the art to practice it, what is desired to have protected by Letters Patent is set forth in the following claims:

I claim:

1. A device for degassing molten metal comprised of chamber means for removing gases from said metal, and conduit means, said conduit means having an upper and lower end, said conduit means being in open communication at its upper end to said chamber means; said conduit means being a fired refractory tube made from a high alumina refractory batch consisting of 45–85%, by weight, of high alumina refractory material, said alumina material analyzing at least about 50% $Al_2O_3$, by weight on an oxide basis, up to 30%, by weight, fused silica, said silica substantially all resting on a 65 mesh screen, the total of high alumina refractory material and fused silica being from 75–85% of the total batch, about 5–15%, by weight, —65 mesh clay plasticizer, the remainder being finely divided calcined alumina; from 50–70% of the batch resting on a 65 mesh screen and 30–50% passing a 65 mesh screen, the fraction resting on a 65 mesh screen being from 25–25% —3 mesh and resting on a 10 mesh screen, of that fraction of the total batch passing a 65 mesh screen at least 70% thereof passing a 150 mesh screen and a portion thereof passing 325 mesh, the portion passing 325 mesh containing at least a total of 10%, based on the total batch weight, of calcined alumina and clay plasticizer, the calcined alumina and clay plasticizer passing a 325 mesh screen being present in substantially equal weight quantities, said conduit mineralogically characterized as having relatively coarse high alumina refractory material loosely bonded in place by a mullite matrix having a network of tessellated cracks; means releasably joining the upper end of said conduit means to said chamber means; and means for raising and lowering the chamber means relative to said ladle means to submerge the lower end of said conduit in molten metal contained in said ladle, and means to create a partial vacuum in said chamber when said conduit lower end is submerged in molten metal.

2. In a device for degassing molten metal comprised of chamber means for removing gases from said metal, and conduit means, said conduit means having an upper and lower end, said conduit means being in open communication at its upper end to said chamber means; the improvement comprising said conduit means being fired refractory tube having a permeability of less than about 0.05 cu. in./sec./in.$^2$/in. thickness/lb. air pressure and being made from a high alumina refractory batch consisting of 45–85%, by weight, of high alumina refractory material, said alumina material analyzing at least about 50% $Al_2O_3$, by weight on an oxide basis, up to 30% by weight, fused silica, said silica resting on a 65 mesh screen, the total of high alumina refractory material and fused silica being from 75–85% of the total batch, about 5–15%, by weight, —65 mesh ball clay plasticizer, the remainder being finely divided calcined alumina; from 50–70% of the batch resting on a 65 mesh screen and 30–50% passing a 65 mesh screen, the fraction resting on a 65 mesh screen being from 25–35% —3 and resting on a 10 mesh screen, of that fraction of the total batch passing a 65 mesh screen at least 70% thereof passing a 150 mesh screen and a portion thereof passing 325 mesh, the portion passing 325 mesh containing at least a total of 10%, based on the total batch weight, of calcined alumina and ball clay, the calcined lumina and ball clay passing a 325 mesh screen being present in substantially equal weight quantities, said conduit mineralogically characterized as having relatively coarse high alumina refractory material loosely bonded in place by a mullite matrix having a network of tesselated cracks; and means releasably joining the upper end of said conduit means to said chamber means.

References Cited

UNITED STATES PATENTS

| | | | |
|---|---|---|---|
| 2,569,430 | 9/1951 | Schroeder et al. | 106—65 |
| 3,054,155 | 9/1962 | Zickfoose. | |
| 3,067,050 | 12/1962 | Miller | 106—65 |
| 3,135,616 | 6/1964 | Norton | 106—65 |
| 3,246,889 | 4/1966 | Sieckman et al. | |
| 3,264,123 | 8/1966 | Alper et al. | 106—68 X |

J. SPENCER OVERHOLSER, *Primary Examiner.*

E. MAR, *Assistant Examiner.*